United States Patent [19]
Wechsler

[11] 3,725,994
[45] Apr. 10, 1973

[54] METHOD OF SHRINKING COLLARS ON A SHAFT

[75] Inventor: Richard L. Wechsler, Bethlehem, Pa.

[73] Assignee: Bethlehem Steel Corporation, Bethlehem, Pa.

[22] Filed: Aug. 6, 1970

[21] Appl. No.: 61,531

[52] U.S. Cl....................29/447, 29/DIG. 35, 29/252
[51] Int. Cl. ...........................................B23p 11/02
[58] Field of Search........................29/DIG. 35, 252, 29/447, 427, 525

[56] References Cited

UNITED STATES PATENTS

| | | |
|---|---|---|
| 1,250,525 | 12/1917 | Sunderland...............29/DIG. 35 UX |
| 2,403,165 | 7/1946 | Aspin........................29/DIG. 35 UX |
| 2,609,595 | 9/1952 | Rossheim........................29/447 UX |
| 3,003,231 | 10/1961 | Tiess et al..............................29/427 |
| 3,098,285 | 7/1963 | Kelzenberg et al. ................29/447 X |
| 3,435,499 | 4/1969 | Rackoff et al. .....................29/447 X |

*Primary Examiner*—Charlie T. Moon
*Attorney*—Joseph J. O'Keefe

[57] ABSTRACT

Method and apparatus for shrinking a metallic collar onto a shaft, with means provided for applying a coolant to the circumference of the collar while maintaining pressure thereon.

2 Claims, 6 Drawing Figures

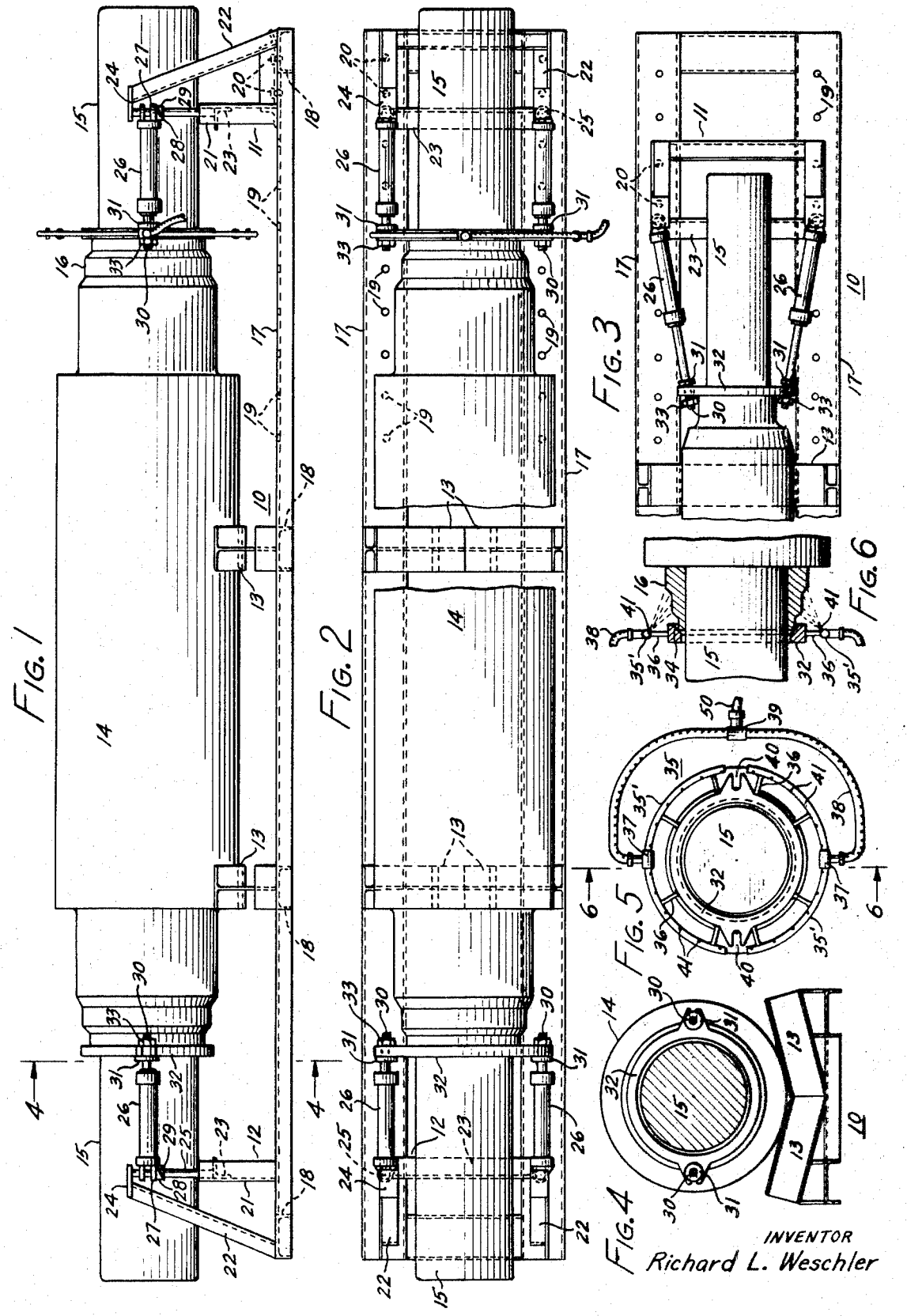

3,725,994

METHOD OF SHRINKING COLLARS ON A SHAFT

BACKGROUND OF THE INVENTION

It is well known to assemble a collar on a shaft, by shrink fitting the former onto the latter. As used herein, the term collar includes any annular member such as a ring or sleeve, and the term shaft includes any substantially cylindrical shape such as a roll. The high joint strength of the shrink fit between the two parts is effected by heating the outer part only or by heating the outer part and cooling the inner part. The inside diameter of the outer part is slightly less than the outside diameter of the inner part, in the ambient condition, as is well understood by those skilled in the art. Radial pressure set up at the adjacent surfaces upon return to ambient temperatures causes the two parts to be held firmly together. This is an extremely useful tool in reconditioning rolls and in placing thrust rings on both new and reconditioned rolls.

The methods currently used for shrink fitting two parts together often result in distortion of the parts. The outer part is not held in place as the shrinkage progresses with the result that the outer part does not bear fully on the inner part as was intended. Thus additional costly machining may be necessary. Furthermore, convection currents carry air from the area beneath the heated part upward around the part leaving a portion of the top of the part unaffected by cooling air resulting in uneven cooling of the part and consequent distortion thereof.

It is an object of this invention, therefore, to provide a method that will control the shrinkage of the heated part in a shrink fit assembly.

It is a further object of this invention to provide apparatus that will provide uniform cooling of the heated part.

It is an additional object of the invention to provide adjustable apparatus for shrinking collars on a wide range of sizes of shafts.

SUMMARY OF THE INVENTION

The instant invention accomplishes these objects by providing ruggedly built apparatus which is adapted to support a wide range of sizes of shafts for shrinking collars onto the journals thereof, and having means for applying uniform pressure to the collar while uniformly cooling same.

BRIEF DESCRIPTION OF THE DRAWINGS

FIG. 1 is an elevational view of the apparatus of the instant invention with the cooling apparatus shown on one end of the apparatus only;

FIG. 2 is a plan view of the apparatus;

FIG. 3 is a partial plan view of one end of the apparatus showing another embodiment of the invention;

FIG. 4 is a sectional view taken on line 4—4 of FIG. 1;

FIG. 5 is a detail view of the pressure ring with cooling apparatus attached; and FIG. 6 is a sectional view taken on line 6—6 of FIG. 5.

DESCRIPTION OF THE PREFERRED EMBODIMENT

Referring now to the FIGURES and particularly to FIGS. 1 and 2 the apparatus is seen generally to comprise a frame 10 having an adjustable support bracket 11 at one end thereof and a stationary support bracket 12 at the other end. Cradles 13 are mounted intermediate the ends of frame 10 to support the workpiece, e.g., a shaft 14 having journals 15 onto which it is desired to shrink a collar 16. The cradles 13 here shown are fixedly mounted to frame 10 to accommodate a large range of sizes of shafts so that the center of gravity of the shaft lies between the cradles. It is obvious that if desired one or both of the cradle members could conveniently be made adjustable.

Frame 10 comprises channel members 17 spaced apart by additional channel members 18 and fixed thereto as by welding to form a rigid structure. The channel members 17 are seen to include a plurality of spaced holes 19 for positioning adjustable support bracket 11 longitudinally on the frame 10. Bolts 20 are included for fixing the bracket 11 in the desired position.

Support brackets 11 and 12 are similar in design except for the adjustable feature of bracket 11 and comprise upright members 21, bracing members 22, cross-tie members 23 all fabricated from structural angles. Plates 24 mounted at the upper end of the support brackets form an upper mounting surface for clevis control rods 25 which are mounted at their lower ends on the aforesaid cross-tie members 23.

Power cylinders 26 as e.g. hydraulic or pneumatic, are provided with a clevis 27 at one end for mounting on the vertical control rods 25. The clevis 27 is slidable on the rod 25 for vertical adjustment of the cylinder so that the center line of the power cylinders and the center line of the shaft are horizontally coplanar. The arrangement of the clevis 27 on rod 25 also provides a pivotable mounting for the cylinders 26 thus allowing the cylinders to be rotated or swung toward or away from the centerline of the shaft in a horizontal plane. A locking collar 28 having a set screw 29 is provided on each rod 25 as shown on FIG. 1 to lock the cylinders 26 in the desired vertical position. The mounting of the power cylinder 26 described herein provides means for adjusting the power cylinders relative to the longitudinal axis of said shaft. The rod end 30 of the power cylinder 26 is threaded for a short distance from the end and is provided with a collar 31 which acts as a stop for pressure plate 32 to be described in detail later. A locking nut 33 is drawn up on the threaded rod end 30 to lock the pressure plate 32 against collar 31.

Pressure plate 32, best seen in FIGS. 4, 5 and 6 comprises an annular plate the inside diameter of which is larger that the diameter of the journal 15. The cross-section of plate 32, FIG. 6, shows a beveled surface 34 which is the surface that bears against the collar 16 during the shrinking operation to provide uniform pressure against the collar. A pair of connecting ears or notches 40 are provided on the pressure plate to engage the rod ends 30 of power cylinders 26.

The cooling apparatus comprises bustle pipes 35 which are attached to the pressure plates 32 to supply a uniform flow of coolant over the circumference of the collar during shrinking. The pipes 35 comprise a pair of identical pipe sections 35' offset from and tied to the pressure plate 32 by connectors 36. The pipes are provided with a plurality of spaced holes 41 to project streams of coolant onto the heated collar surface. The pipe sections 35' are provided with T-fitting 37 for attachment of flexible hose 38 which is in turn provided with T-fitting 39 for attachment to a source of coolant 50 as e.g. air. The flow of coolant is controlled by a valve (not shown).

In operation: A shaft which is to have thrust ring collars shrunk on it is placed on the cradles 13 so that the working area of one end is within the stroke of power cylinders 26 which are attached to the stationary support bracket 12. The adjustable cylinder support bracket 11 is then moved from the other end of frame 10 to place it in position so that the working area of the other end of the shaft is within the stroke of the power cylinders supported thereon. Movement of the adjustable support 11 is made as desired and bolts 20 are inserted in the set of holes 19 nearest the desired position of the support bracket. The locking collars 28 are loosened and the cylinders adjusted vertically so that their center lines are horizontally coplanar with the center line of the shaft.

A lifting rig (not shown) is used to remove the collar 16 from an adjoining oven, where it has been heated. The power cylinders 26 are swung out of the way and the heated collars placed on the journals 15 and moved against the shaft. A pressure plate 32 of suitable size is then slipped over the journal and the rod ends 30 of the power cylinders 26 engage the pressure plate through the notches 40 provided therein. A nut 33 is drawn up tight against pressure plate 32 on the threaded end portion of rod 30. The pressure plates 32 are moved toward the heated collar 16 at a controlled rate of speed by admitting fluid into the piston end of the cylinders 26. A check is made to insure that the plate and collar are concentric just before contact is made between them. Pressure is then applied to the plate to provide a uniform, continuous pressure, forcing the collar 16 against the shaft shoulder while the collar cools and shrinks. The beveled section of the annular pressure plate 32 serves as a self-centering pressing feature against the edge of the collar 16 in substantially line contact.

The pressure plate 32 is provided with a bustle pipe 35, which may be a copper pipe arranged around and radially offset from the outer edge of the annular plate. The pipe is fabricated in two sections 35' to permit an opening for the rod ends 30 of the cylinders 26 to be manipulated into the notches 40 of the pressure plate 32, and is provided with a plurality of spaced holes of small diameter adapted to project streams of coolant onto the circumference of the heated collar 16. The coolant is thus distributed uniformly around the entire annular surface. The rate of flow of coolant can be controlled by a throttling valve or the like.

The embodiment pictured in FIG. 3 exemplifies the flexibility of the apparatus which is adapted to fit a wide range of sizes of shafts. The pivotal mounting of power cylinders 26 allows the cylinders to swing in toward the shaft center to engage a pressure plate of small diameter for use on small shafts. Beveled washers (not shown) may be used between the plate 32 and nut 33 and plate 32 and collar 31 if desired.

The many advantages of the apparatus of the instant invention are thus clearly disclosed. The apparatus eliminates the haphazard manual methods of current practice for shrinking collars onto shafts. An added advantage is the conservation of labor since only one man is required to set up the apparatus and then he is free to leave during the shrinking process. The uniform cooling and uniform pressure applied by the apparatus insures the collar ends being flush with the shaft shoulder and eliminates distortion of the collar as shrinking progresses.

I claim:

1. A method for shrinking a collar on a shaft having a shoulder comprising the steps of:
    a. providing a collar having an inside diameter less than the outside diameter of said shaft,
    b. heating said collar,
    c. placing said heated collar onto said shaft,
    d. applying pressure to one end of said collar to force the other end of said collar against said shoulder, and
    e. cooling said collar while maintaining said pressure.

2. The method of claim 1 wherein the cooling step of subparagraph (e) includes applying a coolant uniformly to the circumference of said collar.

* * * * *